United States Patent
Watanabe et al.

(10) Patent No.: US 8,080,146 B2
(45) Date of Patent: Dec. 20, 2011

(54) SEPARATOR FOR USE IN FUEL CELL AND MANUFACTURING METHOD THEREFOR

(75) Inventors: Yusuke Watanabe, Toyota (JP); Kazutaka Iizuka, Nissin (JP); Osamu Yamazaki, Saitama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 725 days.

(21) Appl. No.: 12/223,857

(22) PCT Filed: Feb. 21, 2007

(86) PCT No.: PCT/JP2007/053702
§ 371 (c)(1),
(2), (4) Date: Aug. 12, 2008

(87) PCT Pub. No.: WO2007/105486
PCT Pub. Date: Sep. 20, 2007

(65) Prior Publication Data
US 2010/0233584 A1  Sep. 16, 2010

(30) Foreign Application Priority Data

Mar. 13, 2006  (JP) ................................. 2006-067249

(51) Int. Cl.
*C25D 13/12* (2006.01)
(52) U.S. Cl. ........................................ 204/486; 204/510
(58) Field of Classification Search .................. 204/486, 204/510; 205/317
See application file for complete search history.

(56) References Cited

U.S. PATENT DOCUMENTS

| 3,642,586 A | | 2/1972 | Shepard et al. |
| 4,832,808 A | * | 5/1989 | Buchwalter .................. 204/500 |
| 6,372,376 B1 | * | 4/2002 | Fronk et al. .................. 429/487 |
| 2005/0241732 A1 | | 11/2005 | Ishigami et al. |

FOREIGN PATENT DOCUMENTS

| EP | 1 107 340 A2 | 6/2001 |
| JP | 61-51769 A | 3/1986 |
| JP | 2-966595 B | 8/1999 |
| JP | 2000-156234 A | 6/2000 |
| JP | 2004-288419 A | 10/2000 |
| JP | 2001-196080 A | 7/2001 |
| JP | 2002-025574 A | 1/2002 |
| JP | 2004-238717 A | 8/2004 |
| JP | 2005-063889 A | 3/2005 |
| JP | 2006-45647 A | 2/2006 |
| JP | 2007-242478 A | 9/2007 |

OTHER PUBLICATIONS

O'Grady Journal of the Electrochemical Society vol. 127 No. 3 pp. 555-563.*
Office Action issued Aug. 10, 2011 in German Patent Application No. 11 2007 000 607.2-45 and partial English translation thereof.

* cited by examiner

*Primary Examiner* — Kishor Mayekar
(74) *Attorney, Agent, or Firm* — Kenyon & Kenyon LLP

(57) ABSTRACT

A separator for use in a fuel cell has an iron-based hydrous oxide film formed on a passive film of a peripheral surface except a gas channel of a separator substrates of SUS by cathodic electrolysis treatment in an alkaline solution and further a resin layer of an electrodeposited water-soluble resin formed on the iron-based hydrous oxide film.

4 Claims, 4 Drawing Sheets

SEPARATOR FOR USE IN FUEL CELL AND MANUFACTURING METHOD THEREFOR

This is a 371 national phase application of PCT/JP2007/053702 filed 21 Feb. 2007, claiming priority to Japanese Patent Application No. 2006-067249 filed 13 Mar. 2006, the contents of which are incorporated herein by reference.

TECHNICAL FIELD

The present invention relates to a separator for use in a fuel cell and a manufacturing method therefor, and in particular, relates to a separator for use in a fuel cell, which has an improved adhesion of a separator substrate to a resin coating layer and thereby has excellent durability, and a manufacturing method therefor.

BACKGROUND ART

For instance, a solid polymer fuel cell has a cell as a minimum unit, which is prepared by sandwiching an electrolyte membrane 52 made of a solid polymer film between two electrodes of a fuel electrode 50 and an air electrode 54 to form a membrane electrode assembly (MEA), and further sandwiching the MEA between two separators 40, as is shown in FIG. 4, and normally has a plurality of the cells stacked as a fuel cell stack (FC stack) to generate high voltage.

A mechanism of generating an electric power in a solid polymer fuel cell will be now described below. In general, a fuel gas, for instance a hydrogen-containing gas, is supplied to a fuel electrode (anode side electrode) 50. On the other hand, an oxidizer gas, for instance, a gas mainly containing oxygen ($O_2$) or air, is supplied to an air electrode (cathode side electrode) 54. The hydrogen-containing gas is supplied to the fuel electrode 50 through a thin groove formed in the surface of a separator 40, and is decomposed into electrons and hydrogen ions ($H^+$) by a catalytic action of the electrode. The electrons move to the air electrode 54 from the fuel electrode 50 through an external circuit to generate an electric current. On the other hand, the hydrogen ions ($H^+$) pass through an electrolyte membrane 52 to reach the air electrode 54, are coupled with oxygen and the electrons which have passed through the external circuit, and produce reaction water ($H_2O$). Heat generated simultaneously with a coupling reaction between hydrogen ($H_2$), oxygen ($O_2$) and the electrons is collected by cooling water. The water (hereinafter referred to as "reaction water") produced in the cathode side at which the air electrode 54 exists is discharged from the cathode side.

In addition, the two separators which sandwich the above described MEA are partition plates which separate hydrogen gas from oxygen gas and simultaneously have a function of electrically connecting stacked cells in series. The two separators also have fine grooves on the surface to form an uneven shape thereon, which are a gas flow passage for passing the hydrogen-containing gas, the oxygen-containing gas and air therethrough.

An example of a structure of a conventional cell is shown in FIG. 5 and FIG. 6. FIG. 5 shows a cross section along the line A-A' of FIG. 6.

As is shown in FIG. 5 and FIG. 6, supply communication holes 12a, 12b and 12c for supplying a fuel gas, an oxidizer gas and cooling water are provided respectively in one end of two sheets of separators 110 and 120, and discharge communication holes 14a, 14b and 14c for discharging the fuel gas, the oxidizer gas and the cooling water are provided in another end of the two sheets of the separators 110 and 120, with gas channels 152 and 154 for passing the fuel gas and the oxidizer gas respectively therein, which have been supplied from the supply communication holes 12a and 12b respectively, being further provided in the separators 110 and 120. In addition, recesses 106 and 116 are formed in facing surfaces of the separators 110 and 120 respectively, sealants 60a and 60b for respectively separating the fuel gas from the oxidizer gas are provided in periphery portions on both faces of an MEA 30 which is an assembly, and the sealants 60a and 60b are bonded to the two sheets of the separators 110 and 120 by adhesives 70a and 70b respectively to form the cell.

However, when a separator is made from stainless steel (so-called, SUS), a passive film 22 made of a chromium oxide film is formed on the surface of a SUS separator substrate 20, as shown in FIG. 3. On the other hand, an eco-friendly material tends to be used in any field, and in the above described adhesive and sealant, a water-soluble resin, for instance, tends to be used in place of a conventional lipophilic resin which is soluble in a solvent. However, the above described passive film 22 has low affinity with the hydrophilic water-soluble resin. Accordingly, when the above described water-soluble resin is directly bonded onto the SUS separator substrate 20 as the adhesive or as the sealant without the use of the adhesive, the water-soluble resin is occasionally peeled off due to a shear stress generated in a step of stacking cells for use in a fuel cell having the above described assembly sandwiched between a pair of the separators into a stack form, and fastening the stack by pressurizing the manifold, or is peeled off due to thermal expansion occurring during use, and is occasionally even attached and then detached, because the water-soluble resin has low adhesion to the substrate.

Technology is also proposed for the purpose of preventing the corrosion of a main body of a metal sheet having the manifold for passing a fuel gas into and out of a fuel gas channel in a central part in the separator of a solid polymer fuel cell, by forming a fluorine resin coating layer on an end surface of the above described manifold and protecting an exposed surface of the main body of the metal sheet with the fluorine resin coating layer (for instance, see Japanese Patent Laid-Open Publication No. 2002-25574).

In recent years, as demand for fuel cells has increased more and more, a fuel cell has been expected to have improved durability.

DISCLOSURE OF THE INVENTION

The present invention is designed with respect to the above described problems, and provides a separator for use in a fuel cell having superior durability, by forming an iron-based hydrous oxide film having high adhesion to a resin layer previously formed on a separator substrate, and forming the resin layer on the iron-based hydrous oxide film, and provides a manufacturing method therefor.

A separator for use in a fuel cell according to the present invention and a manufacturing method therefor have features described below.

(1) A separator for use in a fuel cell, comprises a pair of separator substrates of stainless steel, an iron-based hydrous oxide film formed on each peripheral surface of said pair of separator substrates by cathodic electrolysis treatment of the separator substrates except each gas channel therein in an alkaline solution and a resin layer of an electrodeposited water-soluble resin formed on the iron-based hydrous oxide film on at least one of said pair of separator substrates.

The iron-based hydrous oxide film is formed on a passive film existing on the surface of the separator substrate of stainless steel by the cathodic electrolysis treatment in the alkaline solution, so that the above described electrolytically treated separator substrate can keep anticorrosive properties peculiar to the untreated separator substrate. Furthermore, the above described ferrous hydrous oxide film has a similar composition to that of the passive film on the separator substrate, and accordingly has high adhesion to the passive film due to a metallic bond. On the other hand, the above described ferrous hydrous oxide film can be bonded to a hydrophilic functional group of an electrodeposited water-soluble resin composing a resin layer to be formed thereon through a hydrogen bond for instance, and accordingly has high adhesion to the resin layer as well. Accordingly, the separator can prevent the resin from peeling due to shear stress which might be generated in a step of stacking cells for use in a fuel cell having the above described assembly sandwiched between a pair of the separators into a stack form, and fastening the stack by pressurizing the manifold, or due to thermal expansion which might occur during use, and has no risk of causing the detachment/attachment of the resin, because the separator substrate has high adhesion to the resin. Accordingly, the separators can further increase a seal effect between themselves.

(2) In the separator for use in the fuel cell according to the above described feature (1), the electrodeposited water-soluble resin is an amine-based resin.

The amine-based resin has an amine group which is an affinitive functional group, accordingly has high affinity to an iron-based hydrous oxide film formed on a separator substrate, and consequently has high adhesion as well to the iron-based hydrous oxide film formed on the separator substrate. Particularly, the above described ferrous hydrous oxide film has a mixed composition of hydroxides and oxides of iron, and accordingly has many functional groups such as a hydroxyl group dotted on the surface, which can form a hydrogen bond with the amine group in the amine-based resin. Accordingly, the electrodeposited amine-based resin easily fits the iron-based hydrous oxide film on the separator substrate, can form the layer of the resin into a uniform thickness, and can show a sufficient seal effect of the separator even with a thinner resin layer than ever. In addition, an amine-based electrodeposition coating has many coupling points with the above described ferrous hydrous oxide film, and accordingly inhibits pinholes from being produced.

(3) A method for manufacturing a separator for use in a fuel cell, comprises the steps of: cathodically electrolyzing each peripheral surface except each gas channel of a pair of separator substrates of stainless steel in an alkaline solution to form an iron-based hydrous oxide film on each peripheral surface of said pair of separator substrates; and electrodepositing an electrodeposited water-soluble resin on the iron-based hydrous oxide film on at least one of said pair of separator substrates.

As described above, the iron-based hydrous oxide film is formed on a passive film existing on the surface of the separator substrate of stainless steel by cathodic electrolysis treatment in the alkaline solution, so that the above described electrolytically treated separator substrate can keep anticorrosive properties peculiar to the untreated separator substrate. Furthermore, the above described ferrous hydrous oxide film has a similar composition to that of the passive film on the separator substrate, and accordingly has high adhesion to the passive film due to a metallic bond. On the other hand, the above described ferrous hydrous oxide film can be bonded to a hydrophilic functional group of an electrodeposited water-soluble resin composing a resin layer to be formed thereon through a hydrogen bond for instance, and accordingly has high adhesion to the resin layer as well. Accordingly, the separator can prevent the resin from peeling due to a shear stress which might be generated in a step of fastening the stack of fuel cells, or due to thermal expansion which might occur during use, and has no risk of causing the detachment/attachment of the resin, because the separator substrate has high adhesion to the resin. Accordingly, the separators increase a seal effect between themselves due to the resin layer, and further improve the durability of the obtained fuel cell.

(4) In the method for manufacturing the separator for use in the fuel cell according to the feature (3), the alkaline solution is an electrolytic treatment solution which is an aqueous solution of 5 to 50 wt % of sodium hydroxide, or an aqueous solution prepared by adding a buffer of 0.2 to 20 wt % of trisodium phosphate dodecahydrate and 0.2 to 20 wt % of sodium carbonate to the solution of 5 to 50 wt % of sodium hydroxide; and the separator substrates are electrolyzed in the alkaline solution at a temperature of 20° C. to 95° C., with a current density of 0.5 A/dm$^2$ or higher, and for a treatment period of 10 seconds or longer.

A uniform ferrous hydrous oxide film can be formed on the separator by cathodically electrolyzing the separator on the above described conditions.

(5) In the method for manufacturing the separator for use in the fuel cell according to the above described feature (3) or (4), the electrodeposited water-soluble resin is an amine-based resin.

As described above, the amine-based resin has an amine group which is an affinitive functional group, accordingly has high affinity to an iron-based hydrous oxide film formed on a separator substrate, and consequently has high adhesion as well to the iron-based hydrous oxide film formed on the separator substrate. Particularly, the above described ferrous hydrous oxide film has a mixed composition of hydroxides and oxides of iron, and accordingly has many functional groups such as a hydroxyl group dotted on the surface, which can form a hydrogen bond with the amine group in the amine-based resin. Accordingly, the electrodeposited amine-based resin easily fits the iron-based hydrous oxide film on the separator substrate, can form the layer of the resin into a uniform thickness, and can show a sufficient seal effect of the separator even with a thinner resin layer than ever.

BEST MODE FOR CARRYING OUT THE INVENTION

In the following, embodiments according to the present invention will be described with reference to the drawings.

[Separator for Use in Fuel Cell and Manufacturing Method Therefor]

A separator for use in a fuel cell according to a preferred embodiment of the present invention will be described.

Figure 1:
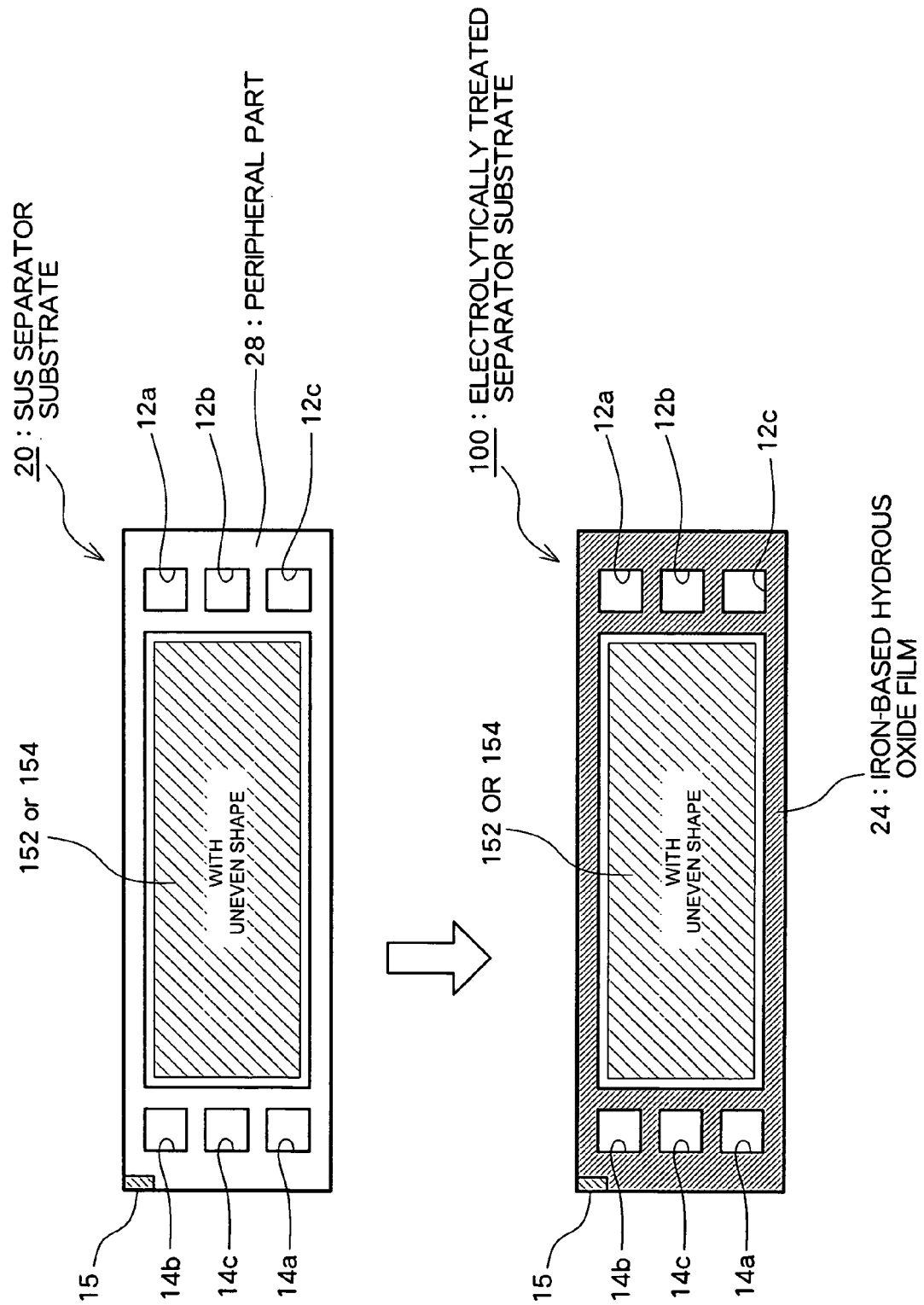
FIG. 1 is a view for describing a region to be subjected to cathodic electrolysis treatment of a separator for use in a fuel cell according to the present invention.

A material of a SUS separator substrate shown in FIG. 1 includes austenitic stainless steel such as SUS304, SUS305, SUS310, SUS316 and SUSMX7; ferritic stainless steel such as SUS430; martensitic stainless steel such as SUS403, SUS410, SUS416 and SUS420; and precipitation-hardened stainless steel such as SUS631.

As shown in FIG. 1, an SUS separator substrate 20 in the present embodiment has supply communication holes 12a, 12b and 12c for supplying a fuel gas, an oxidizer gas and cooling water respectively in one end thereof, and discharge communication holes 14a, 14b and 14c for discharging the fuel gas, the oxidizer gas and the cooling water respectively in another end thereof, and further has gas channels of irregular grooves 152 and 154 for passing the fuel gas and oxidizer gas supplied from the supply communication holes 12a and 12b therein in the separator substrate 20.

In the present embodiment, the SUS separator substrate 20 has an iron-based hydrous oxide film formed by cathodic electrolysis treatment on a peripheral part 28 of the separator substrate 20 except for the gas channels 152 and 154 which are covered by a mask. Specifically, the iron-based hydrous oxide film is formed on peripheral ends of the supply communication holes 12a, 12b and 12c for receiving the fuel gas, the oxidizer gas and the cooling water and the discharge communication holes 14a, 14b and 14c for discharging the fuel gas, the oxidizer gas and the cooling water, and a sealing region at which the separators are connected. The iron-based hydrous oxide film is formed of a mixture of hydroxides of iron and oxides of iron. As is shown in FIG. 1, the electrolytically treated separator 100 has the iron-based hydrous oxide film 24 formed on the peripheral ends except the gas channels 152 and 154.

As for the above described mask, an approximately rectangular sealing film for blocking the penetration of an electrolytic solution may be removably bonded to the gas channel of the SUS separator substrate 20. Alternatively, a conventional masking method can be used such as a method of applying an insulative resin on the gas channel of the SUS separator substrate 20, and solidifying the resin.

In the present embodiment, a SUS separator substrate 20 shown in FIG. 1 is cathodically electrolyzed by the steps of: electrically connecting an electrode connection part 15 of the separator substrate 20 to a cathode; immersing the workpiece of the separator substrate 20 into an electrolytic treatment solution of an alkaline solution to use it as a negative electrode; providing iron or the above described stainless steel as a positive electrode; and forming an iron-based hydrous oxide film up to a predetermined thickness. In the above description, when stainless steel is used as the positive electrode, the stainless steel is preferably a ferritic stainless steel containing nickel in an amount of less than 3 wt %. In addition, detailed conditions of the cathodic electrolysis treatment will be described later.

The reason for masking a gas channel region of a separator substrate in cathodic electrolysis treatment according to the present embodiment will be now described below. If the separator substrate having the gas channel region not masked is subjected to the cathodic electrolysis treatment, an iron-based hydrous oxide film is formed on the gas channel region as well. On the other hand, a fuel cell is formed by preparing a cell for use in a fuel cell by sandwiching the assembly between a pair of separators and further stacking the cell, as was described above. When the fuel cell is used, a fuel gas or an oxidizer gas passes through the gas channel. Then, iron hydroxide or iron oxide slowly elutes from the iron-based hydrous oxide film formed on the gas channel region into the assembly having an electrolyte membrane made of a polymer electrolyte membrane sandwiched between two electrodes that are a fuel electrode and an air electrode, which may cause degradation of the fuel cell. For this reason, when the separator substrate is subjected to cathodic electrolysis treatment in the present embodiment, the gas channel region is masked prior to the treatment so that the iron-based hydrous oxide film cannot be formed thereon.

Figure 2:
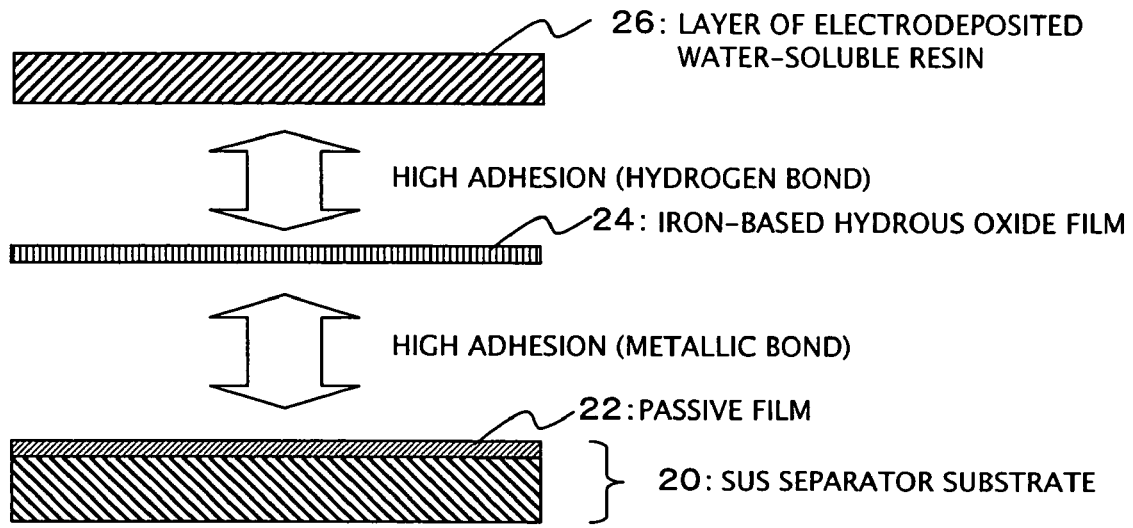
FIG. 2 is a schematic view for describing adhesion working between an iron-based hydrous oxide film and an electrodeposited water-soluble resin layer in a separator for use in a fuel cell according to the present invention.
Figure 3:
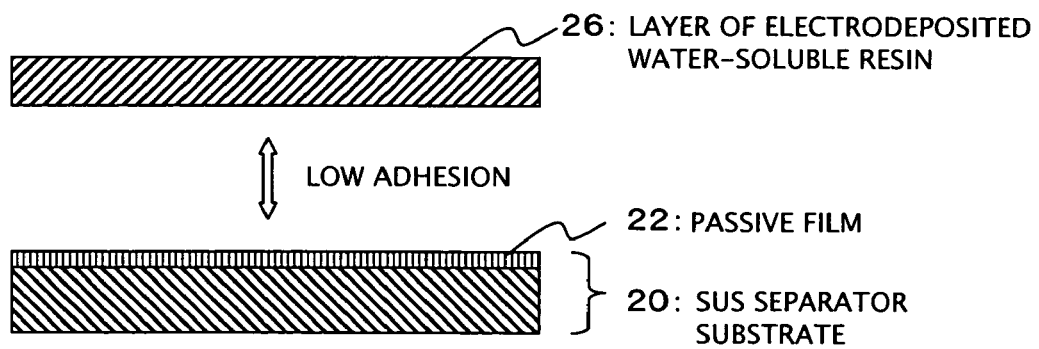
FIG. 3 is a schematic view for describing adhesion working between the surface of SUS and an electrodeposited water-soluble resin in a separator for use in a fuel cell according to the present invention.
Figure 4:
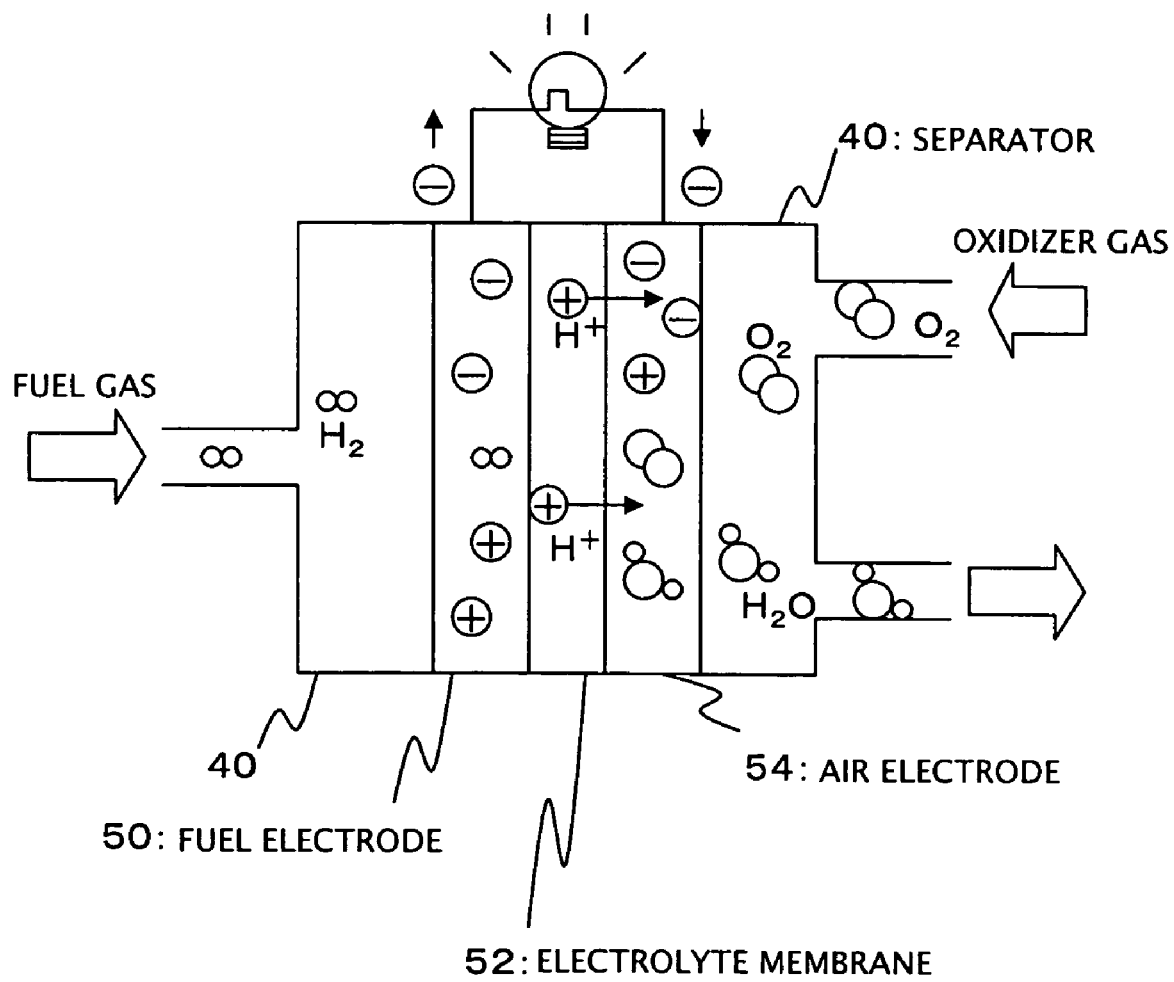
FIG. 4 is a view for describing a structure of a cell of a fuel cell and a mechanism for generating electric power.
Figure 5:
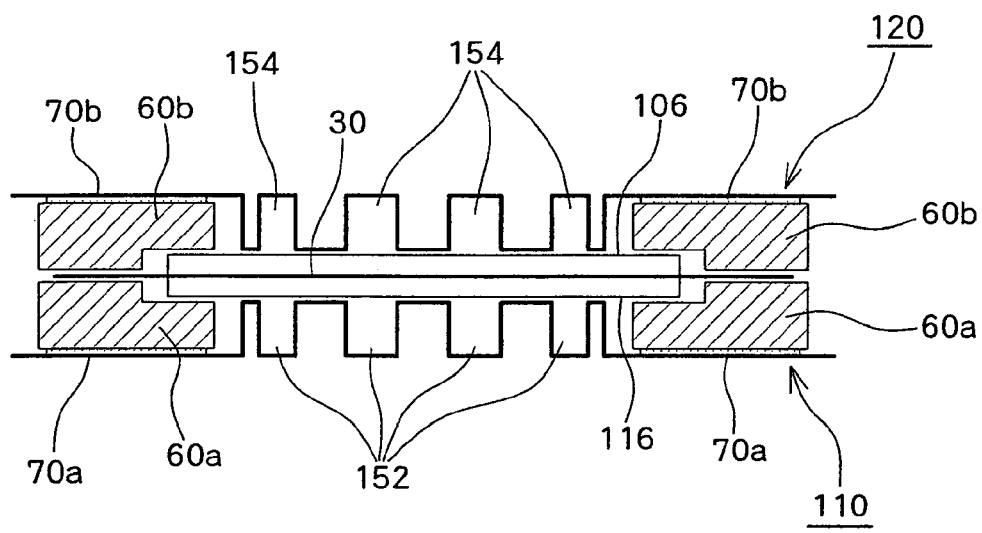
FIG. 5 is a sectional view for describing a configuration of one embodiment of a cell for use in a conventional fuel cell.
Figure 6:
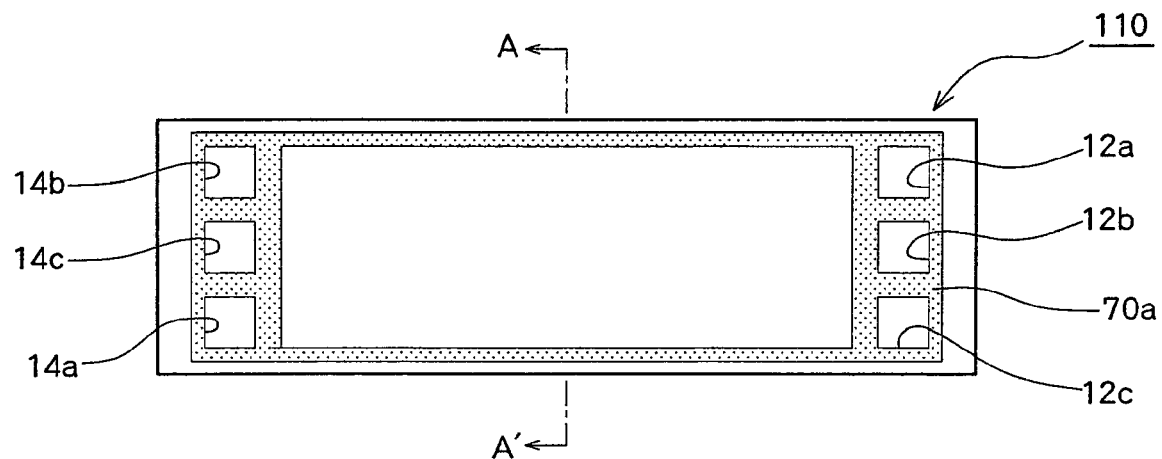
FIG. 6 is a view for describing a position of a sealant adhesively bonded to a separator in a cell for use in a conventional fuel cell.

In the present embodiment, a workpiece of an SUS separator substrate 20 is set at a negative electrode, and is cathodically electrolyzed in an alkaline solution. Accordingly, the above described ferrous hydrous oxide film 24 is formed on a passive film 22 made from chromium oxide on the surface of the SUS separator substrate 20, as is shown in FIG. 2. The iron-based hydrous oxide film 24 has a maximum thickness of 10 nm. In addition, because the iron-based hydrous oxide film 24 is formed on the passive film 22 existing on the surface of the SUS separator substrate 20 by cathodic electrolysis treatment in the alkaline solution which will be described later, the electrolytically treated separator substrate 100 (see FIG. 1) keeps anticorrosive properties peculiar to the untreated SUS separator substrate 20, and further has high adhesion between the above described ferrous hydrous oxide film 24 and the passive film 22 on the separator substrate due to a metallic bond caused by similar compositions between them.

If the SUS separator substrate 20 is electrolyzed in the alkaline solution as a positive electrode, the passive film formed on the SUS separator substrate 20 elutes, and iron in SUS further elutes to form an iron oxide film on the separator substrate 20. In such a case, the separator substrate 20 may have a risk of its anticorrosive properties deteriorating, because of having lost the passive film therefrom. On the other hand, when the SUS separator substrate is electrolyzed with an acidic solution as the positive electrode, the passive film elutes as well, and further chromium in the SUS elutes to form a chromium oxide film on the separator substrate. In such a case, the separator substrate keeps its wetting properties to a water-soluble resin inferior, while keeping its satisfactory anticorrosive properties, because the chromium oxide film is the passive film. Accordingly, in the present embodiment, it is preferable to electrolyze the SUS separator substrate 20 in the alkaline solution as the negative electrode.

In the next step, a layer 26 of an electrodeposited water-soluble resin is formed on the above described ferrous hydrous oxide film 24. In this case, the resin layer is formed after having made a gas channel part of an electrolytically treated separator substrate 100 (FIG. 1) and a back region of the electrolytically treated separator substrate 100, which is an opposite surface to the surface for sandwiching the assembly, masked in the same way as in the above described case.

The layer 26 of the electrodeposited water-soluble resin is formed on the iron-based hydrous oxide film 24 by the steps of: masking the predetermined part on the electrolytically treated separator substrate 100 (FIG. 1); immersing the substrate 100 in an electrodeposited water-soluble resin coating for forming the above described layer 26 of the electrodeposited water-soluble resin; setting the substrate 100 as a negative electrode; and applying a direct current between a counter electrode and the substrate 100 to cathodically electrodeposit the resin onto the substrate 100. In the above step, the electrolytically treated separator substrate 100 (FIG. 1) is connected to a cathode through electrode jointing portions which have been prepared in a plurality of spots in a region corresponding to the back surfaces of the gas channels 152 and 154 or in the whole area of the electrolytically treated separator substrate 100 except the masked region. Then, a workpiece of the electrolytically treated separator 100 is set at a negative electrode, and the electrodeposited water-soluble resin coating is electrodeposited on the region except the masked part.

An electrodeposited water-soluble resin coating to be used for forming the above described layer 26 of the electrodeposited water-soluble resin can be an amine-based resin containing a hydrophilic functional group, for instance, an amine group. The amine-based resin includes, for instance, a polyamide resin, a polyamide-imide resin and an amine-curable epoxy resin.

The above described amine-based resin has an amine group which is an affinitive functional group, accordingly has high affinity to an iron-based hydrous oxide film 24 formed on a separator substrate, and consequently has high adhesion as well to the iron-based hydrous oxide film 24. As described above, the iron-based hydrous oxide film 24 has a mixed composition of hydroxides and oxides of iron, and accordingly has many function groups such as a hydroxyl group dotted on the surface, which can form a hydrogen bond with the amine group in the amine-based resin. Accordingly, the electrodeposited amine-based resin easily fits the iron-based hydrous oxide film 24 on the separator substrate, can form the layer of the electrodeposited water-soluble resin into a uniform thickness, and can show a sufficient seal effect of the separator even with a thinner resin layer than ever.

A method for manufacturing a separator for use in a fuel cell according to the present embodiment has the steps of: masking each gas channel in a pair of separator substrates of stainless steel; cathodically electrolyzing a peripheral surface except each of the gas channels in an alkaline solution to form an iron-based hydrous oxide film on the peripheral surface of a pair of the separator substrates; and electrodepositing an electrodeposited water-soluble resin on the iron-based hydrous oxide film on at least one of a pair of the separator substrates.

As for the conditions of the cathodic electrolysis treatment, the alkaline solution is an electrolytic treatment solution which is a solution containing 5 to 50 wt % of sodium hydroxide or an aqueous buffer solution prepared by adding a buffer of 0.2 to 20 wt % of trisodium phosphate dodecahydrate and 0.2 to 20 wt % of sodium carbonate to the solution containing 5 to 50 wt % of sodium hydroxide, in which the separator is electrolyzed at a liquid temperature of 20° C. to 95° C., with a current density of 0.5 A/dm$^2$ or higher, and for a treatment period of 10 seconds or longer.

The reason why the above described condition range is preferable will now be described below. Specifically, when a SUS separator substrate 20 is cathodically electrolyzed in a solution containing less than 5 wt % of sodium hydroxide, less than 0.2 wt % of trisodium phosphate 12-hydrate and 0.2 wt % of sodium carbonate, the substrate 20 hardly acquires a uniform and effective ferrous hydrous oxide film on its surface, and may lower the adhesion of the iron-based hydrous oxide film to an electrodeposited water-soluble resin. On the other hand, when an electrolytic solution contains more than 50 wt % of sodium hydroxide, more than 20 wt % of trisodium phosphate 12-hydrate and 20 wt % of sodium carbonate, the solution is significantly deteriorated and is economically disadvantageous. When a solution temperature is lower than 20° C., the iron-based hydrous oxide film is not sufficiently formed. On the other hand, when the temperature is higher than 95° C., the concentration of the electrolyte solution is hardly controlled and the iron-based hydrous oxide film may be non-uniformly formed, though the iron-based hydrous oxide film is formed in a shorter period of time and the power consumption is reduced. In addition, when a current density is lower than 0.5 A/dm$^2$ and a treatment period of time is shorter than 10 seconds, the iron-based hydrous oxide film is not sufficiently formed, and may cause the deterioration of the adhesion to the electrodeposited water-soluble resin that will be formed thereon.

Here, the description on cathodic electrolysis treatment and electrodeposition coating will be omitted, because it is the same as in the above description. Furthermore, the reason why the separator substrate is cathodically electrolyzed after the gas channel has been masked is the same as in the above description.

EXAMPLES

In the following, a separator for use in a fuel cell according to the present invention will be described with reference to examples. The present invention is not limited to the following examples as long as it does not exceed its outline.

Example 1

Comparison of wettability between the surface of a cathodically electrolyzed SUS separator substrate in an alkaline solution and the surface of a not-yet-electrolyzed SUS separator.

A rubber sealing member with an approximately rectangular shape having releasable suction cups on four corners was attached to a gas channel region of a SUS separator substrate of austenitic stainless steel. The thus masked separator substrate was treated by the steps of: setting a separator substrate at a negative electrode; setting a SUS plate 430 of ferritic stainless steel at a positive electrode; cathodically electrolyzing the separator substrate in an aqueous electrolytic solution containing 20 wt % of sodium hydroxide, 5 wt % of trisodium phosphate 12-hydrate and 5 wt % of sodium carbonate at 80° C. with a cathodic current density at 6 A/dm$^2$ for 120 seconds; then washing the separator substrate with water; detaching the above described sealing member; and drying the thus treated separator. The resulting electrolytically-treated separator substrate is referred to as "separator substrate (A)".

On the other hand, a SUS separator 304 of austenitic stainless steel, which is untreated, specifically is not yet unelectrolyzed with the above method, is referred to as "separator substrate (B)".

[Wettability Test and Criteria for Wettability]

A contact angle θ was measured by using a fully automatic contact angle meter "DM700" (a product made by Kyowa Interface Science Co., Ltd.) and pure water. As the contact angle θ approaches 0 degrees, the wettability becomes higher. In the present invention, the contact angle θ is preferably 45 degrees or less under the above described measurement conditions.

As a result of the above described wettability test, the surface of an iron-based hydrous oxide film on the above described separator substrate (A) showed a contact angle θ of 2 to 10 degrees. On the other hand, the surface of a not-yet-electrolyzed separator substrate (B) showed a contact angle θ of 65 to 75 degrees. These results revealed that the iron-based hydrous oxide film having high hydrophilicity was formed on the separator substrate by the above described cathodic electrolysis treatment and improved the wettability of the separator substrate.

Example 2

A rubber sealing member with an approximately rectangular shape having releasable suction cups on four corners was attached to a gas channel region of a separator substrate (A) which has been cathodically electrolyzed in the above method, and similarly a rubber sealing member was attached to the entire back surface of the separator (A), which is an opposite surface to the surface of sandwiching the assembly. Then, the above described masked separator substrate (A) was immersed in an electrodeposition bath of 20 wt % coating containing a polyamide-imide resin as a negative electrode; an electrode area ratio was adjusted into positive/negative: −1/2; a distance between electrodes was set at 15 cm; and a solution temperature was controlled into 30° C. An applied voltage was increased to a predetermined voltage for five seconds, and was kept at the predetermined voltage for 115 to 145 seconds after reached the predetermined voltage to coat the separator substrate with the cationic electrodeposition coating. The resulting separator substrate having a resin layer formed thereon is referred to as "separator substrate C".

A rubber sealing member with an approximately rectangular shape having releasable suction cups on four corners was attached to a gas channel region of a separator substrate (B) which has not been electrolyzed in the above method, and similarly a rubber sealing member was attached to the entire back surface of the separator (B), which is an opposite surface to the surface of sandwiching the assembly. Then, the resin layer was formed on the separator substrate (B) in the same electrolytic bath as described above, under the same electrodeposition coating conditions. The resulting separator substrate having the resin layer formed thereon is referred to as "separator substrate D".

[Corrosion Test]

The test was conducted by the steps of: immersing a resin-coated substrate in an acidic solution containing sulfuric acid and Cl− (500 ppm) at the pH of 2.0 as a positive electrode; increasing a voltage applied between the positive electrode and a counter electrode; and measuring the voltage at which a corrosion current begins to pass between the positive electrode and the counter electrode.

As a result of having conducted the above described corrosion test, the voltage was 1.2 V or higher at which the corrosion current passed through a separator substrate C which had a resin layer formed thereon after having been subjected to the above described cathodic electrolysis treatment. In contrast to this, the voltage was 0.53 to 0.55 V at which a corrosion current passed through a separator substrate D which had a resin layer formed thereon without having been subjected to the electrolytic treatment. It is understood from the above described result that the separator substrate having the resin layer formed thereon after having been subjected to the cathodic electrolysis treatment according to the present invention is clearly more excellent in anticorrosive properties than a separator substrate which has not been subjected to the cathodic electrolysis treatment.

The present invention provides the separator having high adhesion to other separators, and consequently can provide a fuel cell showing superior anticorrosive properties and high durability.

In the above, the present invention has been described in detail, but the scope of the present invention is not limited to that described above.

In addition, the detailed description, the claims, the drawings and the abstract of the invention in the specification disclosed in Japanese Patent Application No. 2006-067249 filed on Mar. 13, 2006 are all incorporated into the present application.

INDUSTRIAL APPLICABILITY

A separator for use in a fuel cell according to the present invention and a manufacturing method therefor are effective in any field of application of use for a fuel cell, but in particular, can be provided for a fuel cell for use in a vehicle.

The invention claimed is:

1. A method for manufacturing a separator for use in a fuel cell, comprising the steps of:
    cathodically electrolyzing each peripheral surface except each gas channel of a pair of separator substrates of stainless steel in an alkaline solution to form an iron-based hydrous oxide film on each peripheral surface of said pair of separator substrates; and
    electrodepositing an electrodeposited water-soluble resin on the iron-based hydrous oxide film on at least one of said pair of separator substrates.

2. The method for manufacturing a separator for use in a fuel cell according to claim 1, wherein
    the alkaline solution is an electrolytic treatment solution which is an aqueous solution of 5 to 50 wt % of sodium hydroxide, or an aqueous solution prepared by adding a buffer of 0.2 to 20 wt % of trisodium phosphate dodecahydrate and 0.2 to 20 wt % of sodium carbonate to the solution of 5 to 50 wt % of sodium hydroxide; and the separator substrates are electrolyzed in the alkaline solution at a temperature of 20° C. to 95° C., with a current density of 0.5 A/dm$^2$ or higher, and for a treatment period of 10 seconds or longer.

3. The method for manufacturing a separator for use in a fuel cell according to claim 2, wherein the electrodeposited water-soluble resin is an amine-based resin.

4. The method for manufacturing a separator for use in a fuel cell according to claim 1, wherein the electrodeposited water-soluble resin is an amine-based resin.

* * * * *